US011287400B2

(12) United States Patent
Wang et al.

(10) Patent No.: US 11,287,400 B2
(45) Date of Patent: Mar. 29, 2022

(54) LARGE-PANEL ULTRASONIC ON-MACHINE NON-CONTACT SCANNING THICKNESS MEASUREMENT EQUIPMENT AND THICKNESS MEASUREMENT METHOD

(71) Applicant: DALIAN UNIVERSITY OF TECHNOLOGY, Liaoning (CN)

(72) Inventors: Yongqing Wang, Liaoning (CN); Haibo Liu, Liaoning (CN); Te Li, Liaoning (CN); Meng Lian, Liaoning (CN); Kuo Liu, Liaoning (CN); Zhenyuan Jia, Liaoning (CN)

(73) Assignee: DALIAN UNIVERSITY OF TECHNOLOGY, Dalian (CN)

( * ) Notice: Subject to any disclaimer, the term of this patent is extended or adjusted under 35 U.S.C. 154(b) by 134 days.

(21) Appl. No.: 16/767,019

(22) PCT Filed: Sep. 29, 2019

(86) PCT No.: PCT/CN2019/108839
§ 371 (c)(1),
(2) Date: May 26, 2020

(87) PCT Pub. No.: WO2020/192057
PCT Pub. Date: Oct. 1, 2020

(65) Prior Publication Data
US 2021/0072195 A1   Mar. 11, 2021

(30) Foreign Application Priority Data

Mar. 27, 2019   (CN) .......................... 201910234944.8

(51) Int. Cl.
*G01N 29/28* (2006.01)
*G01N 29/265* (2006.01)

(52) U.S. Cl.
CPC .......... *G01N 29/265* (2013.01); *G01N 29/28* (2013.01)

(58) Field of Classification Search
CPC .... G01N 29/28; G01N 29/265; G01N 29/225; G01N 2291/2632; G01N 2291/02854; G01B 17/02
(Continued)

(56) References Cited

U.S. PATENT DOCUMENTS 5,569,835 A * 10/1996 Kenney ................ G01B 5/0014
356/630
7,334,479 B2 * 2/2008 Leybovich ............ G01B 17/02
73/620

FOREIGN PATENT DOCUMENTS

CN   102506781 A   6/2012
CN   104647141 A   5/2015
(Continued)

OTHER PUBLICATIONS

An Office Action dated Jan. 3, 2020 issued in corresponding CN Application No. 201910234944.8 (pp. 16).
A Response to Office Action dated May 13, 2020 issued in corresponding CN Application No. 201910234944.8 (pp. 4).

*Primary Examiner* — Jacques M Saint Surin
(74) *Attorney, Agent, or Firm* — Muncy, Geissler, Olds & Lowe, P.C.

(57) ABSTRACT

A large-panel ultrasonic on-machine scanning thickness measurement equipment and method is disclosed. A GNCMT is adopted as the measuring machine main body on which a measured large panel is clamped and conducts scanning measurement motion; a non-contact ultrasonic measurement device is installed on the spindle of the machine tool for realizing transmission and acquisition of ultrasonic signals; a coupling liquid circulation system with the functions of multi-layer filtering, flow monitoring and regulation is set up; a jet flow immersion coupling mode is
(Continued)

adopted on the surface of the measured large panel, and micro-emulsion cutting fluid is used as compatible coupling liquid of ultrasonic on-machine thickness measurement; and the coupling liquid is recycled, purified and stably supplied circularly. The thickness measurement equipment has high multi-function integration and reliable performance. It is easy to operate and highly automated, which effectively realizes nondestructive, accurate, efficient on-machine wall thickness measurement of the large panel.

3 Claims, 1 Drawing Sheet

(58) Field of Classification Search
USPC .......................................................... 73/618
See application file for complete search history.

(56) References Cited

FOREIGN PATENT DOCUMENTS

| CN | 105157630 | A | 12/2015 | | |
|---|---|---|---|---|---|
| CN | 105891333 | A | 8/2016 | | |
| CN | 106643591 | A | 5/2017 | | |
| CN | 106871773 | A | 6/2017 | | |
| CN | 105157630 | * | 9/2017 | ............. | G01B 17/02 |
| CN | 207936933 | U | 10/2018 | | |
| CN | 109855576 | A | 6/2019 | | |
| CN | 110919460 | * | 3/2020 | ............. | B23Q 17/20 |
| JP | 2009294012 | A | 12/2009 | | |
| JP | 2011123063 | * | 6/2011 | ............. | G01B 17/02 |
| JP | 2016075584 | * | 12/2016 | ............. | G01B 17/02 |
| WO | WO 2016056499 | * | 4/2016 | ............. | G01B 17/02 |
| WO | WO 2020192057 | * | 10/2020 | ............. | G01B 17/02 |

* cited by examiner

LARGE-PANEL ULTRASONIC ON-MACHINE NON-CONTACT SCANNING THICKNESS MEASUREMENT EQUIPMENT AND THICKNESS MEASUREMENT METHOD

TECHNICAL FIELD

The present invention belongs to the technical field of detection, and particularly relates to a large-panel ultrasonic on-machine non-contact scanning thickness measurement equipment and thickness measurement method.

BACKGROUND

Fuel tank is the main bearing structure of carrier rocket body, and the weight accounts for more than 80% of the total rocket. To satisfy lightweight requirement, a large number of grid features are designed on the inner wall of the tank. The uniformity of the remaining wall thickness of the grid is the premise to ensure the uniformity of the mechanical property of the panel, which puts forward a new challenge to the manufacturing accuracy. The remaining thickness control in the processing of the panel grid is the core problem. Accurate obtainment of the distribution of the remaining wall thickness after grid processing is the key to confirm whether the grid processing quality is qualified. In the existing industrial thickness measurement method, ultrasonic thickness measurement is a preferred method for one-sided thickness measurement of parts with one side blocked due to the transmission and interface reflection characteristics of the ultrasonic. However, due to the large size of the large panel structure and the large number of points to be measured, the conventional manual hand-held measurement method has significant defects such as low accuracy of measurement result, low efficiency, poor stability and high labor intensity. Therefore, it is urgent to develop a kind of equipment and method for accurate and efficient wall thickness measurement of the large panel to satisfy the needs of high accuracy and high-performance manufacturing for the tank panel of the carrier rocket.

In 2014, Harbin Institute of Technology disclosed a large-panel thickness in situ measurement method in patent CN104647141A. An ultrasonic probe is installed in the location of the milling cutter of a CNC milling machine (Computer Numerical Control milling machine); and the probe is controlled to contact with the panel point by point to conduct automatic scanning measurement. In 2015, Dalian University of Technology disclosed a contact type on-machine ultrasonic automatic thickness measurement method in patent CN105157630A. An integrated ultrasonic probe device installed on the spindle of the machine tool and having the functions of flexible contact buffer, in place automatic detection of the probe and automatic spray of coupling liquid conducts point by point contact with the measured workpiece for automatic thickness measurement. In 2016, Dalian University of Technology disclosed a thin-walled part on-machine ultrasonic thickness measurement method for adaptive adjustment of probe in patent CN106643591A. The angle and the location are adjusted adaptively according to the local surface shape of the measured workpiece in the thickness measurement process by point by point contact between the probe and the measured workpiece through a ball hinge mechanism, so as to achieve an ideal normal coincidence state. In the above inventions, the ultrasonic thickness measurement devices are integrated to automatic motion equipment to realize ultrasonic on-machine thickness measurement. Compared with manual hand-held thickness measurement, measurement accuracy and efficiency are greatly increased. However, the above inventions adopt the contact type ultrasonic on-machine thickness measurement method and conduct wall thickness measurement through the point by point contact with the measured workpiece. Due to the large size and low rigidity of the large panel, the point by point contact type thickness measurement method not only results in low measurement efficiency due to cumbersome adjustment process, but also easily causes scratch of workpiece surface and even deformation of the workpiece due to improper contact force control. Therefore, the above inventions are difficult to meet the needs of precise and efficient wall thickness measurement of the large panel.

SUMMARY

The present invention mainly solves the technical problem of overcoming the defects of the existing methods, and invents large-panel ultrasonic on-machine non-contact scanning thickness measurement equipment and thickness measurement method with respect to the needs of precise and efficient wall thickness measurement of the large panel. A large-stroke, high-accuracy and light-duty GNCMT (Gantry Numerical Control Machine Tool) is adopted as the measuring machine main body, which has large scanning measurement range, high motion and positional accuracy and reliable control. A non-contact ultrasonic thickness measurement device which can be installed on the spindle of the machine tool is invented. It has the advantages of nondestructive testing, adaptation to high-speed scanning measurement motion and the like, and better makes up for the defects of difficult regulation of contact force, low measurement efficiency and the like during point by point contact type thickness measurement. A coupling liquid circulation system with the functions of multi-layer filtering, flow monitoring and regulation is set up, which effectively realizes recycle, purification and stable circulation supply at specific flow of the coupling liquid in the process of ultrasonic on-machine thickness measurement. The measured large panel is clamped in such a manner that the side with grid features faces a workbench of the machine tool, which effectively eliminates the adverse effects of the grid features on the state of ultrasonic echo signals and enhances accuracy and stability of thickness measurement results. High-accuracy and reliable control of automatic scanning measurement motion is realized through a numerical control measuring program.

The present invention adopts the following technical solution: large-panel ultrasonic on-machine non-contact scanning thickness measurement equipment, which is composed of a GNCMT 1, a non-contact ultrasonic thickness measurement device 2 and a coupling liquid circulation system 3; the large-stroke, high-accuracy and light-duty GNCMT 1 is adopted as the measuring machine main body on which a measured large panel 4 is clamped and the scanning measurement motion is conducted on it; the non-contact ultrasonic thickness measurement device 2 is installed on the spindle 1.8 of the GNCMT 1 for realizing transmission and acquisition of ultrasonic signals; a coupling liquid circulation system with the functions of multi-layer filtering, flow monitoring and regulation is set up; a jet flow immersion coupling mode is adopted on the surface of the measured large panel 4, and micro-emulsion cutting fluid is used as compatible coupling liquid of ultrasonic on-machine thickness measurement; and the coupling liquid is recycled, purified and stably supplied circularly.

The workbench 1.2 is installed on the lathe bed 1.1 of the GNCMT 1; the first X axis guide rail 1.5 and the second X axis guide rail 1.6 are respectively installed on the workbench 1.2; the gantry 1.3 is composed of the first stand column 1.3*a*, the second stand column 1.3*b* and the beam 1.3*c*; the first stand column 1.3*a* and the second stand column 1.3*b* are respectively installed on the first X axis guide rail 1.5 and the second X axis guide rail 1.6; the beam 1.3*c* is fixedly installed between the first stand column 1.3*a* and the second stand column 1.3*b*; the Y axis guide rail 1.7 is arranged on the beam 1.3*c*; the headstock 1.4 is installed on the Y axis guide rail 1.7; the spindle 1.8 and the Z axis guide rail 1.9 for the spindle 1.8 to slide are installed in the headstock 1.4; the first stop block 1.10, the second stop block 1.11 and a plurality of pressing plate components 1.12 for pressing workpiece edges are installed on the workbench 1.2; the first driving device and the second driving device are respectively installed on the first stand column 1.3*a* and the second stand column 1.3*b* and are jointly used for driving the spindle 1.8 to move along X axis; the third driving device is installed on the beam 1.3*c* for driving the spindle 1.8 to move along Y axis; and the fourth driving device is installed in the headstock 1.4 for driving the spindle 1.8 to move along Z axis.

In the non-contact ultrasonic thickness measurement device 2, an ultrasonic transducer 2.3 is installed in the center of a down flange 2.2; the axis of the ultrasonic transducer 2.3 coincides with the axis of the down flange 2.2; the ultrasonic transducer 2.3 is connected with an ultrasonic signal card through a signal line; an injector 2.4 is equipped on the ultrasonic transducer 2.3; the axis of the injector 2.4 coincides with the axis of the ultrasonic transducer 2.3, and is connected with the down flange 2.2 through threads; the injector 2.4 is provided with the first coupling liquid injection port 2.4*a* and the second coupling liquid injection port 2.4*b* radially symmetrically; the first coupling liquid injection port 2.4*a* and the second coupling liquid injection port 2.4*b* are connected to a coupling liquid circulation system 3 through a Y-type pipe; the center of the bottom surface of the injector 2.4 is provided with a coupling liquid jet nozzle 2.4*c*; the down flange 2.2 is connected with an up flange 2.1 through three screws 2.5 which are under circumferential uniform; the axis of the down flange 2.2 coincides with the axis of the up flange 2.1; and a clamping column 2.1*a* is arranged above the up flange 2.1 along the axis and is connected with the spindle 1.8 of the machine tool through a shank.

The coupling liquid circulation system 3 uses microemulsion cutting fluid as jet flow immersion ultrasonic thickness measurement coupling liquid; a collecting tank 3.1 is below the workbench 1.2 of the GNCMT 1; a filter screen 3.1*a* for preliminarily blocking large particle impurities is arranged at the outlet, and is in communication with the inlet 3.2*a* of a sedimentation tank 3.2 through a pipeline 3.7; the sedimentation tank 3.2 is provided with a filter plate 3.2*b* with evenly distributed filter holes to further block the impurities; the inlet 3.2*a* and the outlet 3.2*c* of the sedimentation tank are respectively positioned on both sides of the filter plate 3.2*b*; the outlet 3.2*c* of the sedimentation tank is in communication with a hydraulic pump 3.3 through the pipeline 3.7; the pipeline 3.7 through which the hydraulic pump 3.3 is in communication with the injector 2.4 is successively provided with a filter 3.4 for further purifying the coupling liquid, a hydraulic valve 3.5 for adjusting the coupling liquid flow and a flowmeter 3.6 for observing the coupling liquid flow.

Large-panel ultrasonic on-machine non-contact scanning thickness measurement equipment, which adopts a measurement method as follows: firstly, the measured large panel 4 is clamped in such a manner that the side with grid features faces the workbench 1.2 of the machine tool; next, the parameters in the scanning measurement process are determined according to measurement requirements and the numerical control measuring program is programmed; then, the coupling liquid flow and the coupling gap between the non-contact ultrasonic thickness measurement device 2 and the measured large panel 4 are adjusted according to the state of the ultrasonic echo signals; finally, an upper computer measurement and control system executes the numerical control measuring program, controls the spindle 1.8 of the machine tool to load the non-contact ultrasonic thickness measurement device 2 to conduct scanning thickness measurement for the measured large panel 4 along the preset measuring path, and also collects and stores measuring point coordinates and wall thickness data at high frequency until a whole workpiece is traversed, to complete ultrasonic on-machine non-contact scanning thickness measurement for the measured large panel 4. The method comprises the following specific steps:

First step: clamping a measured workpiece

The measured large panel 4 is horizontally hoisted to the surface of the workbench 1.2 so that the side with grid features faces the workbench 1.2 of the machine tool and the side in a plane state is used as the measured surface; the measured large panel 4 is adjusted so that the first edge 4.*a* and the second edge 4.*b* are respectively abutted against the first stop block 1.10 and the second stop block 1.11 having position coordinates determined in a machine coordinate system and precisely tooled on the workbench 1.2 of the machine tool, to realize positioning and alignment of the measured large panel 4 in the machine coordinate system; six pressing plate components 1.12 are adjusted so that the six pressing plate components respectively clamp the first edge 4.*a* and the third edge 4.*c* of the measured large panel 4 to complete clamping of the measured large panel 4.

Second step: determining measurement parameters

The spindle 1.8 of the machine tool is controlled to load the non-contact ultrasonic thickness measurement device 2 to move to the preset measuring starting point of the measured large panel 4, and X axis coordinate and Y axis coordinate of the current point are recorded as programming zero of the numerical control measuring program; according to the requirements of measuring range, measuring point density and measuring time for the measured large panel 4, the scanning distance along X axis of the "Z"-shaped bidirectional reciprocating scanning measurement path and the spacing between adjacent scanning measurement paths, measuring point coordinate and wall thickness data acquisition frequency and scanning measurement speed are determined; and the numerical control measuring program is programmed based on the above information.

Third step: adjusting the coupling state

The spindle 1.8 of the machine tool is controlled to load the non-contact ultrasonic thickness measurement device 2 to move along Z axis at the preset measuring starting point to a place in which the bottom surface of the injector 2.4 has a distance of about 2 mm from the surface of the measured large panel 4; the hydraulic pump 3.3 of the coupling liquid circulation system 3 is started; the coupling liquid flow is adjusted by adjusting the hydraulic valve 3.5; and the coupling gap between the non-contact ultrasonic thickness measurement device 2 and the measured large panel 4 is adjusted by fine adjustment of the displacement of the spindle 1.8 of the machine tool in Z axis direction until the ultrasonic echo signals are observed and evaluated in good condition, to complete the adjustment of the coupling state of ultrasonic on-machine thickness measurement.

Fourth step: automatic scanning thickness measurement

The upper computer measurement and control system executes the numerical control measuring program, controls the spindle 1.8 of the machine tool to load the non-contact ultrasonic thickness measurement device 2 for conducting bidirectional reciprocating non-contact scanning thickness measurement for the measured large panel 4 along the following preset "Z"-shaped measuring path: conducting continuous scanning motion along +X axis direction from the start control point C11 of the first linear motion segment P1 to the end control point C12 of the first linear motion segment P1, continuously conducting continuous scanning motion along +Y axis direction to the start control point C21 of the second linear motion segment P2, continuously conducting continuous scanning motion along −X axis direction to the end control point C22 of the second linear motion segment P2 and continuously conducting continuous scanning motion along +Y axis direction to the start control point C31 of the third linear motion segment P3, to circulate the scanning measurement with this path as a cycle; meanwhile, the upper computer measurement and control system collects the measuring point coordinates and the wall thickness data at high frequency until the whole workpiece is traversed, to complete ultrasonic on-machine non-contact scanning thickness measurement for the measured large panel 4.

The present invention has beneficial effects: the large-stroke, high-accuracy and light-duty GNCMT (Gantry Numerical Control Machine Tool) is adopted as the measuring machine main body, which has large scanning measurement range, high motion and positional accuracy and reliable control. A non-contact ultrasonic thickness measurement device which can be installed on the machine tool spindle is invented. It has the advantages of nondestructive testing, adapting to high-speed scanning measurement motion and the like, and better makes up for the defects of difficult regulation of contact force during point by point contact thickness measurement, low measurement efficiency and the like. The coupling liquid circulation system with the functions of multi-layer filtering, flow monitoring and regulation is set up, which effectively realizes recycle, purification and stable circulation supply of the coupling liquid at specific flow in the process of ultrasonic on-machine thickness measurement. The thickness measurement equipment has simple structure, high multi-function integration, reliable performance, simple operation of on-machine measurement process and high automation degree, and can effectively realize nondestructive, accurate, efficient and on-machine measurement for wall thickness of the large panel with respect to the characteristics of large size, low stiffness and multiple grid features of the large panel.

DETAILED DESCRIPTION

Specific embodiments of the present invention are described below in detail in combination with the technical solution and accompanying drawings.

Figure 1:
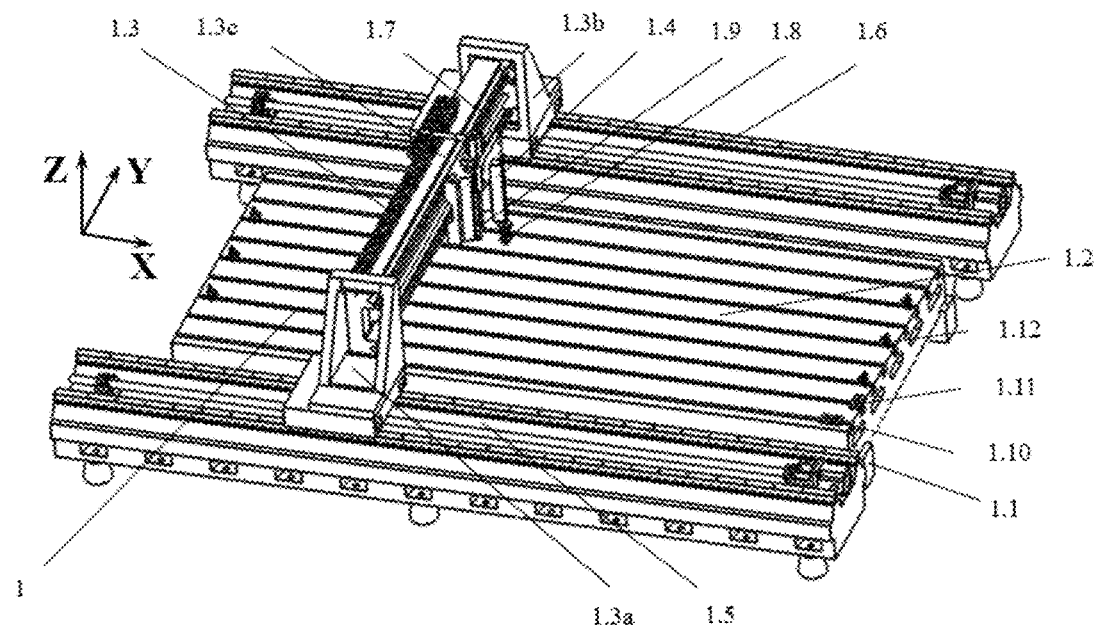
FIG. 1 is a structural schematic diagram of the GNCMT, wherein: 1—GNCMT; 1.1—lathe bed; 1.2—workbench; 1.3—gantry; 1.3a—first stand column; 1.3b—second stand column; 1.3c—beam; 1.4—headstock; 1.5—first X axis guide rail; 1.6—second X axis guide rail; 1.7—Y axis guide rail; 1.8—spindle; 1.9—Z axis guide rail; 1.10—first stop block; 1.11—second stop block; 1.12—pressing plate component; X, Y and Z-X coordinate axis, Y coordinate axis and Z coordinate axis of the measurement coordinate system.
Figure 2:
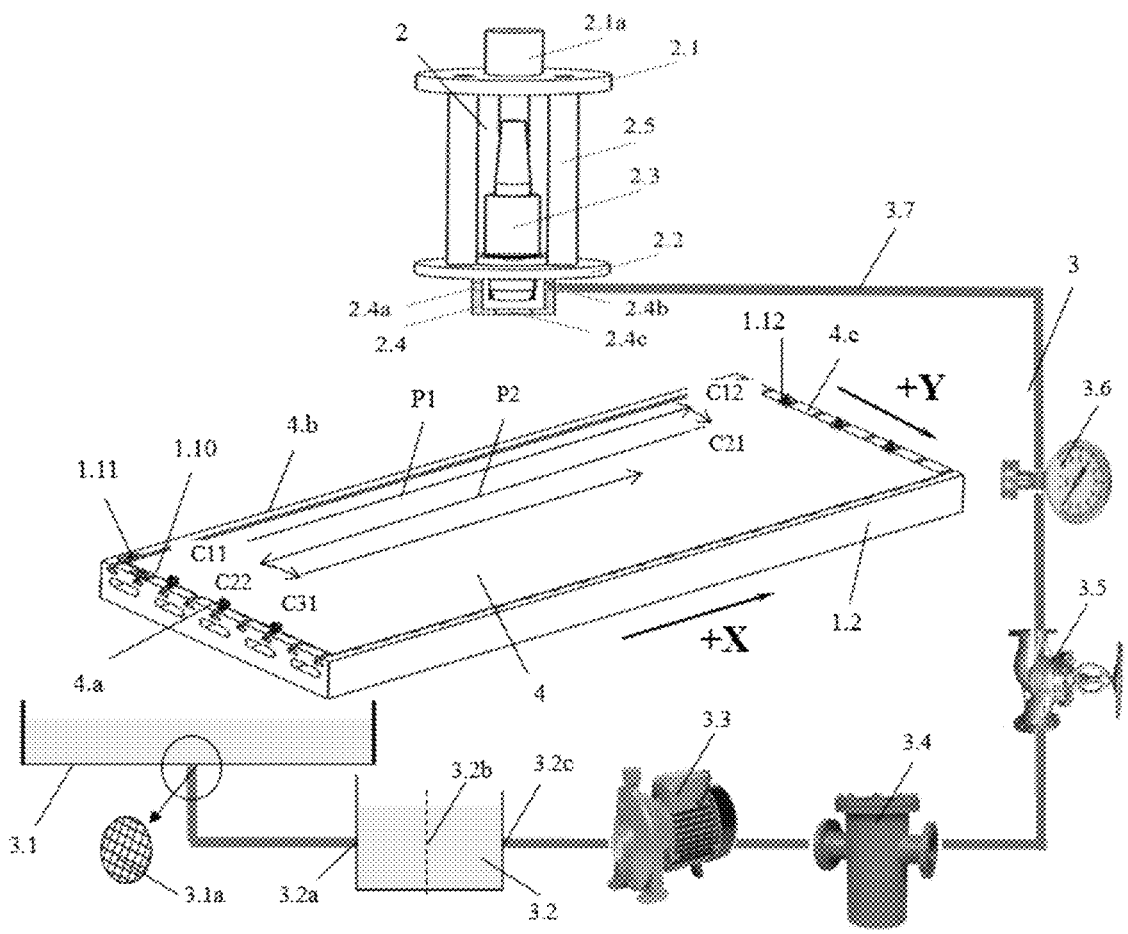
FIG. 2 is a schematic diagram of large-panel ultrasonic on-machine non-contact scanning thickness measurement, wherein: 2—non-contact ultrasonic thickness measurement device; 2.1—up flange; 2.1a—clamping column; 2.2—down flange; 2.3—ultrasonic transducer; 2.4—injector; 2.4a—first coupling liquid injection port; 2.4b—second coupling liquid injection port; 2.4c—coupling liquid jet nozzle; 2.5—screw; 3—coupling liquid circulation system; 3.1—collecting tank; 3.1a—filter screen; 3.2—sedimentation tank; 3.2a—sedimentation tank inlet; 3.2b—filter plate; 3.2c—sedimentation tank outlet; 3.3—hydraulic pump; 3.4—filter; 3.5—hydraulic valve; 3.6—flowmeter; 3.7—pipeline; 4—measured large panel; 4.a—first edge of measured large panel; 4.b—second edge of measured large panel; 4.c—third edge of measured large panel; P1—first linear motion segment; C11—start control point of first linear motion segment P1; C12—end control point of first linear motion segment P1; P2—second linear motion segment; C21—start control point of second linear motion segment P2; C22—end control point of second linear motion segment P2; P3—third linear motion segment; C31—start control point of third linear motion segment P3; +X and +Y−X coordinate axis positive direction and Y coordinate axis positive direction of the measurement coordinate system.

In the embodiments, FIG. 1 is a structural schematic diagram of the GNCMT; FIG. 2 is a schematic diagram of large-panel ultrasonic on-machine non-contact scanning thickness measurement, wherein the measured large panel 4 has a size of 4950 mm×2500 mm; one side has rhombic grid features, and the other side is a plane. Measurement requirements: whole area measurement for the panel; effective measuring point spacing ≤10 mm; total measurement time ≤120 min; micro-emulsion cutting fluid with a volume concentration of 10% is used as the coupling liquid; the jet flow immersion coupling mode is adopted; the center frequency of the ultrasonic probe is 10 MHz.

The equipment is composed of a GNCMT 1, a non-contact ultrasonic thickness measurement device 2 and a coupling liquid circulation system 3; the large-stroke, high-accuracy and light-duty GNCMT 1 is adopted as the measuring machine main body on which a measured large panel 4 is clamped and the scanning measurement motion is conducted; the non-contact ultrasonic thickness measurement device 2 is installed on the spindle 1.8 of the GNCMT 1 for realizing transmission and acquisition of ultrasonic signals; a coupling liquid circulation system with the functions of multi-layer filtering, flow monitoring and regulation is set up; a jet flow immersion coupling mode is adopted on the surface of the measured large panel 4, and micro-emulsion cutting fluid is used as compatible coupling liquid of ultrasonic on-machine thickness measurement; and the coupling liquid is recycled, purified and stably supplied circularly.

Firstly, the thickness measurement equipment is assembled; the workbench 1.2 is installed on the lathe bed 1.1 of the GNCMT 1; the first X axis guide rail 1.5 and the second X axis guide rail 1.6 are respectively installed on the workbench 1.2; the gantry 1.3 is composed of the first stand column 1.3a, the second stand column 1.3b and the beam 1.3c; the first stand column 1.3a and the second stand column 1.3*b* are respectively installed on the first X axis guide rail 1.5 and the second X axis guide rail 1.6; the beam 1.3*c* is fixedly installed between the first stand column 1.3*a* and the second stand column 1.3*b*; the Y axis guide rail 1.7 is arranged on the beam 1.3*c*; the headstock 1.4 is installed on the Y axis guide rail 1.7; the spindle 1.8 and the Z axis guide rail 1.9 for the spindle 1.8 to slide are installed in the headstock 1.4; the fixture device for installing a workpiece is installed on the workbench 1.2, and comprises the first stop block 1.10 and the second stop block 1.11 for alignment of the workpiece and a plurality of pressing plate components 1.12 for pressing workpiece edges; the first driving device and the second driving device are respectively installed on the first stand column 1.3*a* and the second stand column 1.3*b* and are jointly used for driving the spindle 1.8 to move along X axis; the third driving device is installed on the beam 1.3*c* for driving the spindle 1.8 to move along Y axis; and the fourth driving device is installed in the headstock 1.4 for driving the spindle 1.8 to move along Z axis.

In the non-contact ultrasonic thickness measurement device 2, an ultrasonic transducer 2.3 is installed in the center of a down flange 2.2; the axis of the ultrasonic transducer 2.3 coincides with the axis of the down flange 2.2; the ultrasonic transducer 2.3 is connected with an ultrasonic signal card through a signal line; an injector 2.4 is equipped on the ultrasonic transducer 2.3; the axis of the injector 2.4 coincides with the axis of the ultrasonic transducer 2.3, and is connected with the down flange 2.2 through threads; the injector 2.4 is provided with the first coupling liquid injection port 2.4*a* and the second coupling liquid injection port 2.4*b* radially symmetrically; the first coupling liquid injection port 2.4*a* and the second coupling liquid injection port 2.4*b* are connected to a coupling liquid circulation system 3 through a Y-type pipe; the center of the bottom surface of the injector 2.4 is provided with a coupling liquid jet nozzle 2.4*c*; the down flange 2.2 is connected with an up flange 2.1 through three screws 2.5 which are under circumferential uniform; the axis of the down flange 2.2 coincides with the axis of the up flange 2.1; and a clamping column 2.1*a* is arranged above the up flange 2.1 along the axis and is connected with the spindle 1.8 of the machine tool through a shank.

The coupling liquid circulation system 3 uses microemulsion cutting fluid as jet flow immersion ultrasonic thickness measurement coupling liquid; a collecting tank 3.1 is below the workbench 1.2 of the GNCMT 1 for collecting the coupling liquid on the workbench 1.2; a filter screen 3.1*a* for preliminarily blocking large particle impurities is arranged at the outlet, and is in communication with the inlet 3.2*a* of a sedimentation tank 3.2 through a pipeline 3.7; the sedimentation tank 3.2 is provided with a filter plate 3.2*b* with evenly distributed filter holes to further block the impurities; the inlet 3.2*a* and the outlet 3.2*c* of the sedimentation tank are respectively positioned on both sides of the filter plate 3.2*b*; the outlet 3.2*c* of the sedimentation tank is in communication with a hydraulic pump 3.3 through the pipeline 3.7; the pipeline 3.7 through which the hydraulic pump 3.3 is in communication with the injector 2.4 is successively provided with a filter 3.4 for further purifying the coupling liquid, a hydraulic valve 3.5 for adjusting the coupling liquid flow and a flowmeter 3.6 for observing the coupling liquid flow.

The thickness measurement method comprises the following specific steps:

First step: clamping a measured workpiece: the measured large panel 4 is horizontally hoisted to the surface of the workbench 1.2 so that the side with grid features of the measured large panel 4 faces the workbench 1.2 of the machine tool and the side in a plane state is used as a measured surface; the measured large panel 4 is adjusted so that the first edge 4.*a* and the second edge 4.*b* are respectively abutted against the first stop block 1.10 and the second stop block 1.11 having position coordinates determined in the machine coordinate system and precisely tooled on the workbench 1.2 of the machine tool, to realize positioning and alignment of the measured large panel 4 in the machine coordinate system; six pressing plate components 1.12 are adjusted so that the six pressing plate components respectively clamp the first edge 4.*a* and the third edge 4.*c* of the measured large panel 4 to complete clamping of the measured large panel 4.

Second step: determining measurement parameters: the spindle 1.8 of the machine tool is controlled to load the non-contact ultrasonic thickness measurement device 2 to move to the preset measuring starting point of the measured large panel 4, and X axis coordinate and Y axis coordinate of the current point are recorded as programming zero of the numerical control measuring program; according to the measuring requirements for the measured large panel 4, the scanning distance 4980 mm along X axis of the "Z"-shaped bidirectional reciprocating scanning measurement path and the spacing 10 mm between adjacent scanning measurement paths, measuring point coordinate and wall thickness data sampling interval 50 ms, and scanning measurement speed 800 mm/min are determined; and the numerical control measuring program is programmed based on the above information.

Third step: adjusting the coupling state: the spindle 1.8 of the machine tool is controlled to load the non-contact ultrasonic thickness measurement device 2 to move along Z axis at the preset measuring starting point to a place in which the bottom surface of the injector 2.4 has a distance of about 2 mm from the surface of the measured large panel 4; the hydraulic pump 3.3 of the coupling liquid circulation system 3 is started; the coupling liquid flow 50 mL/s is adjusted by adjusting the hydraulic valve 3.5; and the coupling gap 2.5 mm between the non-contact ultrasonic thickness measurement device 2 and the measured large panel 4 is adjusted by fine adjustment of the displacement of the spindle 1.8 of the machine tool in Z axis direction until the ultrasonic echo signals are observed and evaluated in good condition, to complete the adjustment of the coupling state of ultrasonic on-machine thickness measurement.

Fourth step: automatic scanning thickness measurement: the upper computer measurement and control system executes the numerical control measuring program, controls the spindle 1.8 of the machine tool to load the non-contact ultrasonic thickness measurement device for conducting bidirectional reciprocating non-contact scanning thickness measurement for the measured large panel 4 along the preset "Z"-shaped measuring path at scanning measurement speed of 2800 mm/min: conducting continuous scanning motion along +X axis direction from the start control point C11 of the first linear motion segment P1 to the end control point C12 of the first linear motion segment P1, continuously conducting continuous scanning motion along +Y axis direction to the start control point C21 of the second linear motion segment P2, continuously conducting continuous scanning motion along −X axis direction by 4980 mm to the end control point C22 of the second linear motion segment P2 and continuously conducting continuous scanning motion along +Y axis direction by 10 mm to the start control point C31 of the third linear motion segment P3, to circulate the scanning measurement with this path as a cycle; meanwhile, the upper computer measurement and control system collects the measuring point coordinates and the wall thickness data at the sampling interval of 50 ms until the whole workpiece is traversed, to complete ultrasonic on-machine non-contact scanning thickness measurement for the measured large panel 4.

The present invention adopts the ONC (Open Numerical Control) to realize high-accuracy and reliable control of high-speed scanning measurement motion, adopts a special ultrasonic signal card to transmit and collect the ultrasonic signals, and develops special measurement software to collect, store and process measurement data.

Table 1 shows the comparison between the actual measurement results of the present invention and the coordinate measurement results. The comparison shows that the present invention can realize large-panel on-machine automatic scanning thickness measurement and the measurement accuracy is within 0.03 mm.

TABLE 1

| Measured point | 1 | 2 | 3 | 4 | 5 | 6 | 7 | 8 |
|---|---|---|---|---|---|---|---|---|
| Coordinate measurement results | 7.746 | 7.456 | 7.441 | 7.493 | 7.458 | 7.462 | 7.473 | 7.497 |
| Measurement results of the present invention | 7.464 | 7.441 | 7.460 | 7.466 | 7.456 | 7.458 | 7.458 | 7.467 |

The thickness measurement equipment of the present invention has simple structure, high multi-function integration, reliable performance. It is easy to operate and highly automated, which can effectively realize nondestructive, accurate, efficient and on-machine wall thickness measurement of the large panel with respect to the characteristics of large size, low stiffness and multiple grid features of the large panel.

The invention claimed is:

1. Scanning thickness measurement equipment, comprising:
   a gantry numerical control machine tool (GNCMT),
   a non-contact ultrasonic thickness measurement device; and
   a coupling liquid circulation system;
   a measured large panel clamped on the GNCMT, wherein a scanning measurement motion is conducted on the measured large panel;
   a coupling liquid circulation system with functions of multi-layer filtering, flow monitoring and regulation;
   a jet flow immersion coupling mode adopted on a surface of the measured large panel;
   micro-emulsion cutting fluid used as compatible coupling liquid of ultrasonic on-machine thickness measurement, wherein the cutting fluid is recycled, purified and stably supplied circularly
   wherein the non-contact ultrasonic thickness measurement device is installed on a spindle of the GNCMT for realizing transmission and acquisition of ultrasonic signals;
   wherein the GNCMT comprises:
      a workbench installed on a lathe bed;
      a first X axis guide rail and a second X axis guide rail respectively installed on the workbench;
      a gantry composed of a first stand column, a second stand column and a beam; wherein the first stand column and the second stand column are respectively installed on the first X axis guide rail and the second X axis guide rail; wherein the beam is fixedly installed between the first stand column and the second stand column;
      a Y axis guide rail is arranged on the beam;
      a headstock is installed on the Y axis guide rail;
      a Z axis guide rail for the spindle to slide installed in the headstock, together with the spindle;
      a first stop block and a second stop block, for alignment of a workpiece and a plurality of pressing plate components for pressing workpiece edges, installed on the workbench;
      a first driving device and a second driving device respectively installed on the first stand column and the second stand column and jointly used for driving the spindle to move along X axis;
      a third driving device installed on the beam for driving the spindle to move along Y axis; and
      a fourth driving device installed in the headstock for driving the spindle to move along Z axis;
   wherein the non-contact ultrasonic thickness measurement device, comprises:
      an ultrasonic transducer is installed in a center of a down flange;
   wherein an axis of the ultrasonic transducer coincides with an axis of the down flange; the ultrasonic transducer is connected with an ultrasonic signal card through a signal line;
      an injector is equipped on the ultrasonic transducer; wherein an axis of the injector coincides with the axis of the ultrasonic transducer, and is connected with the down flange through threads; wherein the injector is provided with a first coupling liquid injection port and a second coupling liquid injection port radially symmetrically; the first coupling liquid injection port and the second coupling liquid injection port are connected to a coupling liquid circulation system through a Y-type pipe; wherein a center of a bottom surface of the injector is provided with a coupling liquid jet nozzle; the down flange is connected with an up flange through three screws which are under circumferential uniform; the axis of the down flange coincides with the axis of the up flange; and
      a clamping column is arranged above the up flange along the axis and connected with the spindle of the GNCMT through a shank;
   wherein the coupling liquid circulation system uses micro-emulsion cutting fluid as jet flow immersion ultrasonic thickness measurement coupling liquid; the coupling liquid circulation system comprises:
   a collecting tank is below the workbench of the GNCMT;
   a filter screen for preliminarily blocking large particle impurities arranged at an outlet, and in communication with an inlet of a sedimentation tank through a pipeline;
   the sedimentation tank including a filter plate with evenly distributed filter holes to further block the impurities; wherein an inlet and an outlet of the sedimentation tank are respectively positioned on both sides of atho filter plate; wherein the outlet of the sedimentation tank is in communication with a hydraulic pump through the pipeline; and the pipeline through which the hydraulic pump is in communication with the injector is successively provided with a filter for further purifying the coupling liquid, a hydraulic valve for adjusting the coupling liquid flow and a flowmeter for observing the coupling liquid flow.

2. The scanning thickness measurement equipment according to claim 1, adopting a measurement method comprising steps of:
- clamping a measured large panel in a manner that a side with grid features faces the workbench of the GNCMT;
- determining parameters in a scanning measurement process according to measurement requirements and programming a numerical control measuring program;
- adjusting the coupling liquid flow and the coupling gap between the non-contact ultrasonic thickness measurement device and the measured large panel according to a state of ultrasonic echo signals;
- executing, with an upper computer measurement and control system, the numerical control measuring program,
- controlling the spindle of the GNCMT to load the non-contact ultrasonic thickness measurement device to conduct a scanning thickness measurement for the measured large panel along a preset measuring path, and also collecting and storing measuring point coordinates and wall thickness data at high frequency until a whole workpiece is traversed, to complete the scanning thickness measurement for the measured large panel.

3. The scanning thickness measurement equipment according to claim 2, wherein the measurement method includes:
- clamping a measured workpiece; wherein the measured large panel is horizontally hoisted to a surface of the workbench so that the side with grid features of the measured large panel faces the workbench of the GNCMT and the side in a plane state is used as measured surface; wherein the measured large panel is adjusted so that a first edge and a second edge are respectively abutted against a first stop block and a second stop block having position coordinates determined in a machine coordinate system and precisely tooled on the workbench of the GNCMT, to realize positioning and alignment of the measured large panel in the machine coordinate system; a plurality of pressing plate components are adjusted so that the pressing plate components respectively clamp the first edge and the third edge of the measured large panel to complete clamping of the measured large panel;
- determining measurement parameters; wherein the spindle of the GNCMT is controlled to load the non-contact ultrasonic thickness measurement device to move to a preset measuring starting point of the measured large panel, and X axis coordinate and Y axis coordinate of a current point are recorded as programming zero of the numerical control measuring program; according to the requirements of measuring range, measuring point density and measuring time for the measured large panel, a scanning distance along X axis of the "Z"-shaped bidirectional reciprocating scanning measurement path and the spacing between adjacent scanning measurement paths, measuring point coordinate and wall thickness data acquisition frequency and scanning measurement speed are determined; and the numerical control measuring program is programmed based on the above information;
- adjusting the coupling state; wherein the spindle of the GNCMT is controlled to load the non-contact ultrasonic thickness measurement device to move along Z axis at the preset measuring starting point to a place in which the bottom surface of the injector has a distance of about 2 mm from the surface of the measured large panel; the hydraulic pump of the coupling liquid circulation system is started; the coupling liquid flow is adjusted by adjusting the hydraulic valve; and the coupling gap between the non-contact ultrasonic thickness measurement device and the measured large panel is adjusted by fine adjustment of the displacement of the spindle of the GNCMT in Z axis direction until the ultrasonic echo signals are observed and evaluated in good condition, to complete the adjustment of the coupling state of ultrasonic on-machine thickness measurement;
- automatically measuring and scanning thickness; wherein the upper computer measurement and control system executes the numerical control measuring program, controls the spindle of the GNCMT to load the non-contact ultrasonic thickness measurement device for conducting bidirectional reciprocating the scanning thickness measurement for the measured large panel along the following preset "Z"-shaped measuring path; wherein the automatically measuring and scanning thickness comprises:
  - conducting continuous scanning motion along +X axis direction from a start control point of a first linear motion segment to an end control point of the first linear motion segment,
  - continuously conducting continuous scanning motion along +Y axis direction to a start control point of a second linear motion segment,
  - continuously conducting continuous scanning motion along −X axis direction to an end control point of the second linear motion segment, and
  - continuously conducting continuous scanning motion along +Y axis direction to a start control point of a third linear motion segment, to circulate the scanning measurement with this path as a cycle; wherein meanwhile, the upper computer measurement and control system collects the measuring point coordinates and the wall thickness data at high frequency until the whole workpiece is traversed, to complete scanning thickness measurement for the measured large panel.

* * * * *